W. F. HOLT.
VEHICLE WHEEL.
APPLICATION FILED SEPT. 20, 1915.
1,169,403.
Patented Jan. 25, 1916.
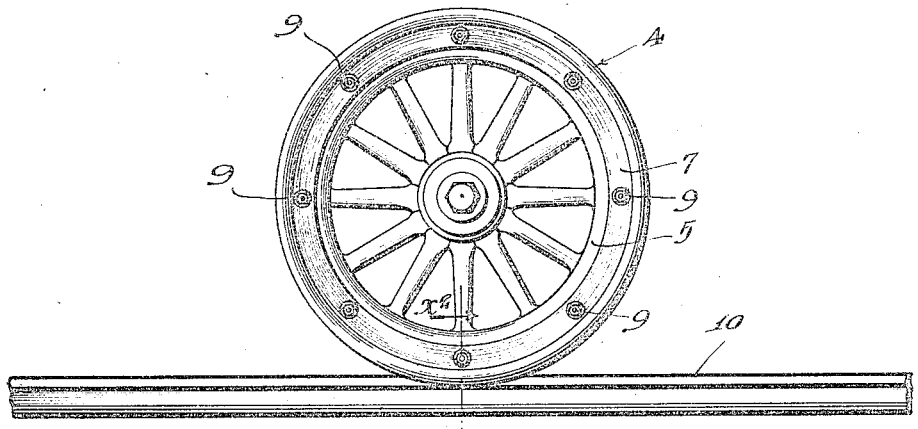
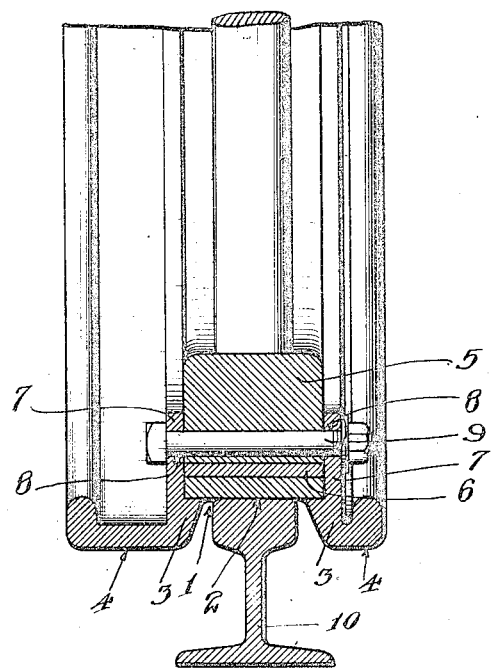
Witnesses:
Inventor
William F. Holt

UNITED STATES PATENT OFFICE.

WILLIAM F. HOLT, OF REDLANDS, CALIFORNIA.

VEHICLE-WHEEL.

1,169,403.

Specification of Letters Patent.

Patented Jan. 25, 1916.

Original application filed June 7, 1915, Serial No. 32,495. Divided and this application filed September 20, 1915. Serial No. 51,584.

*To all whom it may concern:*

Be it known that I, WILLIAM F. HOLT, a citizen of the United States, residing at Redlands, in the county of San Bernardino and State of California, have invented a new and useful Vehicle-Wheel, of which the following is a specification.

This is a division of my application for patent for vehicle wheel, filed June 7, 1915, Serial No. 32,495.

This invention relates in general to convertible vehicle wheels, and broadly stated, an object of the invention is to make provision for adapting the wheels of vehicles to railroad traction and street or highway traction so that the vehicle may be run from a railroad track to any desired point like any ordinary automobile or truck for loading and unloading freight and passengers, and so that the vehicle may be run on the railroad track like any ordinary steam or street railroad car for movement between points not provided with interconnecting highways or streets.

More specifically, an object of this invention is to effect the foregoing without it being necessary to have recourse to a change of wheels or to alterations of any part or parts of the wheels.

Another object is to so construct the vehicle wheels that said wheels may be run directly from the rails to the street and vice versa, without loss of traction.

Another object is to effect the foregoing by construction that is essentially simple and efficient.

Other objects and advantages may appear as the invention is unfolded in the subjoined detail description.

The accompanying drawings illustrate the invention.

Figure 1 is a side elevation of a wheel embodying the invention, and mounted on a track or rail, a fragment of which is shown. Fig. 2 is an enlarged fragmental view partly in section on line indicated by $x^2$—$x^2$, Fig. 1.

Primarily the wheel comprises treads of different diameters extending side by side around the periphery of the wheel formed by a grooved rim which may be formed by several members, the bottom of the groove 1 forming a rail engaging tread 2 provided at its sides with radially extending flanges 3, which are provided at their outer edges with laterally extending flanges 4 that may be the same width as one another, or of different widths, as shown in the drawings, said laterally extending flanges forming the street engaging tread of the wheel and said radially extending flanges preventing the wheel from slipping off the rail upon which it is running.

The felly 5 is provided on its periphery with an under band 6 shrunk onto said felly, the rim being in three sections, the radially extending flanges 3 and laterally extending flanges 4 forming the side sections and the rail engaging tread 2 forming the intermediate section, said rail engaging tread being shrunk onto the under band 6.

The rim is provided with inwardly extending flanges 7 embracing between them the felly 5, said annular flanges being provided with orifices 8 to receive the bolts 9 passing through the felly.

In practical operation, it is clear that a common road vehicle equipped with a set of wheels constructed as above set forth is adapted to run along rails such as that indicated at 10 and that the tread 2 will ride on the ball of the rail and the flanges 3 will prevent the wheel from slipping off of the rail, and it is clear that the wheels may be run off of the ends of the rails or deflected from said rails by suitable switches, not shown, so as to permit the treads 4 to come into contact with the surface of the roadway or street.

It is also clear that the foregoing is accomplished without it being necessary to make any alterations or adjustments to the parts of the wheel, thus saving the time that would be necessary in changing the tread of the wheel as is necessary in devices of the kind heretofore invented.

It is, of course, understood that either or both of the flanges 3 may be provided with a suitable tire or tires constructed of rubber or other material fastened in place on the flange or flanges by any of the means well known in the art, and such construction is not shown and claimed herein but is the subject of my copending application for patent for vehicle wheel, filed.

The foregoing will enable those skilled in the art to make and use the device.

I claim:

A vehicle wheel comprising a felly, a rim formed in three sections, the side sections having radially extending flanges and laterally extending flanges and inwardly extending annular flanges embracing the felly, the intermediate section forming a rail-engaging tread and seated at its edges against the side sections, and bolts passing through said inwardly extending annular flanges and through the felly to hold said sections and felly together.

In testimony whereof, I have hereunto set my hand at Los Angeles, California, this 14th day of September, 1915.

WILLIAM F. HOLT.

In presence of—
 GEORGE H. HILES,
 ANNA F. SCHMIDTBAUER.